(12) United States Patent
Maiman et al.

(10) Patent No.: US 12,536,400 B2
(45) Date of Patent: Jan. 27, 2026

(54) TRANSACTION CARD INCLUDING REMOVABLE CHIP

(71) Applicant: Capital One Services, LLC, McLean, VA (US)

(72) Inventors: Tyler Maiman, Melville, NY (US); Kevin Osborn, Newton, MA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 39 days.

(21) Appl. No.: 18/739,923

(22) Filed: Jun. 11, 2024

(65) Prior Publication Data

US 2024/0330639 A1 Oct. 3, 2024

Related U.S. Application Data

(63) Continuation of application No. 17/538,722, filed on Nov. 30, 2021, now Pat. No. 12,033,017.

(51) Int. Cl.
*G06K 19/077* (2006.01)
*G06K 19/02* (2006.01)
*G06K 19/04* (2006.01)

(52) U.S. Cl.
CPC ....... *G06K 19/07739* (2013.01); *G06K 19/02* (2013.01); *G06K 19/044* (2013.01); *G06K 19/07745* (2013.01)

(58) Field of Classification Search
CPC ............. G06K 19/07739; G06K 19/02; G06K 19/044; G06K 19/07745
USPC ......................................... 361/737
See application file for complete search history.

(56) References Cited

U.S. PATENT DOCUMENTS 6,193,163 B1 * 2/2001 Fehrman .......... G06K 19/07743
235/441
2018/0108595 A1 * 4/2018 Gac .................. G06K 19/07739

* cited by examiner

*Primary Examiner* — Binh B Tran
(74) *Attorney, Agent, or Firm* — KDW Firm PLLC

(57) ABSTRACT

Provided are approaches for removing a chip of a transaction card using a chip removal element. In some approaches, the transaction card may include a body including a first main side opposite a second main side, a chip coupled to the first main side of the body, and a chip removal element disposed between the chip and the body. A first end of the chip removal element may be positioned within a tab recess along the first main side of the body, wherein the chip removal element is operable to decouple the chip from the body when the chip removal element is moved away from the body.

20 Claims, 6 Drawing Sheets

300

PROVIDING A BODY OF A TRANSACTION CARD, THE BODY INCLUDING FIRST AND SECOND MAIN SIDES, AND A CHIP RECESS IN THE FIRST MAIN SIDE — 301

COUPLING A CHIP TO A CHIP REMOVAL ELEMENT — 302

POSITIONING THE CHIP AND THE CHIP REMOVAL ELEMENT WITHIN THE CHIP RECESS, WHEREIN THE CHIP REMOVAL ELEMENT IS SANDWICHED BETWEEN THE CHIP AND A BOTTOM SURFACE OF THE CHIP RECESS, AND WHEREIN A BORDER OF THE CHIP REMOVAL ELEMENT IS POSITIONED WITHIN A TAB RECESS ALONG THE FIRST MAIN SIDE OF THE BODY — 303

FIG. 6

TRANSACTION CARD INCLUDING REMOVABLE CHIP

RELATED APPLICATIONS

This application is a continuation of U.S. patent application Ser. No. 17/538,722, filed on Nov. 30, 2021, titled "TRANSACTION CARD INCLUDING REMOVABLE CHIP". The contents of the aforementioned application are incorporated herein by reference in their entirety.

FIELD

Embodiments of the present disclosure relate to transaction cards and, more particularly, to transaction cards including a chip removal element.

BACKGROUND

Transaction cards, such as credit cards and debit cards, typically contain account information such as the account number, owner's name, expiration date, etc. This information may be provided in different formats, and at different positions along the card. In one format, text is embossed into or printed on the plastic of the card for use visually. In a second format, a magnetic stripe containing the information in a computer-readable form may be provided along the back of the card. In a third format, information is contained on a chip coupled to the front of the card. When the card is no longer useful, such as after the card is expired or is cancelled, it is desirable to destroy the information recorded on the card for security reasons.

The current approach for destruction of plastic cards is to cut the card into a number of small pieces so that it is difficult to reconstruct the data from the pieces. However, this process can be laborious. Furthermore, with some types of cards, such as with metal cards, typical destruction methods are not easily achieved. Thus, it would be desirable to have approaches for inactivating the transaction card by physically removing the chip therefrom.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body having a first main side opposite a second main side, a chip coupled to the first main side of the body, and a chip removal element disposed between the chip and the body. A first end of the chip removal element may be positioned within a tab recess along the first main side of the body, wherein the chip removal element is operable to decouple the chip from the body when the chip removal element is moved away from the body In another approach according to the disclosure, a transaction card may include a body having a first main side opposite a second main side, a chip within a chip recess along the first main side of the body, and a chip removal element disposed between the chip and the body. A border of the chip removal element may be positioned within a tab recess along the first main side of the body, wherein the border of the chip removal element is exposed to an exterior of the second main side, and wherein the chip removal element is operable to decouple the chip from the body when the chip removal element is moved away from the body.

In yet another approach according to the disclosure, a method may include providing a body of a transaction card, the body including a first main side opposite a second main side and a chip recess in the first main side. The method may further include coupling a chip removal element to a chip, and positioning the chip and the chip removal element within the chip recess. The chip removal element may be sandwiched between the chip and a bottom surface of the chip recess, wherein a border of the chip removal element is positioned within a tab recess along the first main side of the body.

BRIEF DESCRIPTION OF THE DRAWINGS

The accompanying drawings illustrate example approaches of the disclosure, including the practical application of the principles thereof, as follows:

FIG. 6 illustrates a flowchart for performing methods in accordance with embodiments of the present disclosure.

Figure 1:
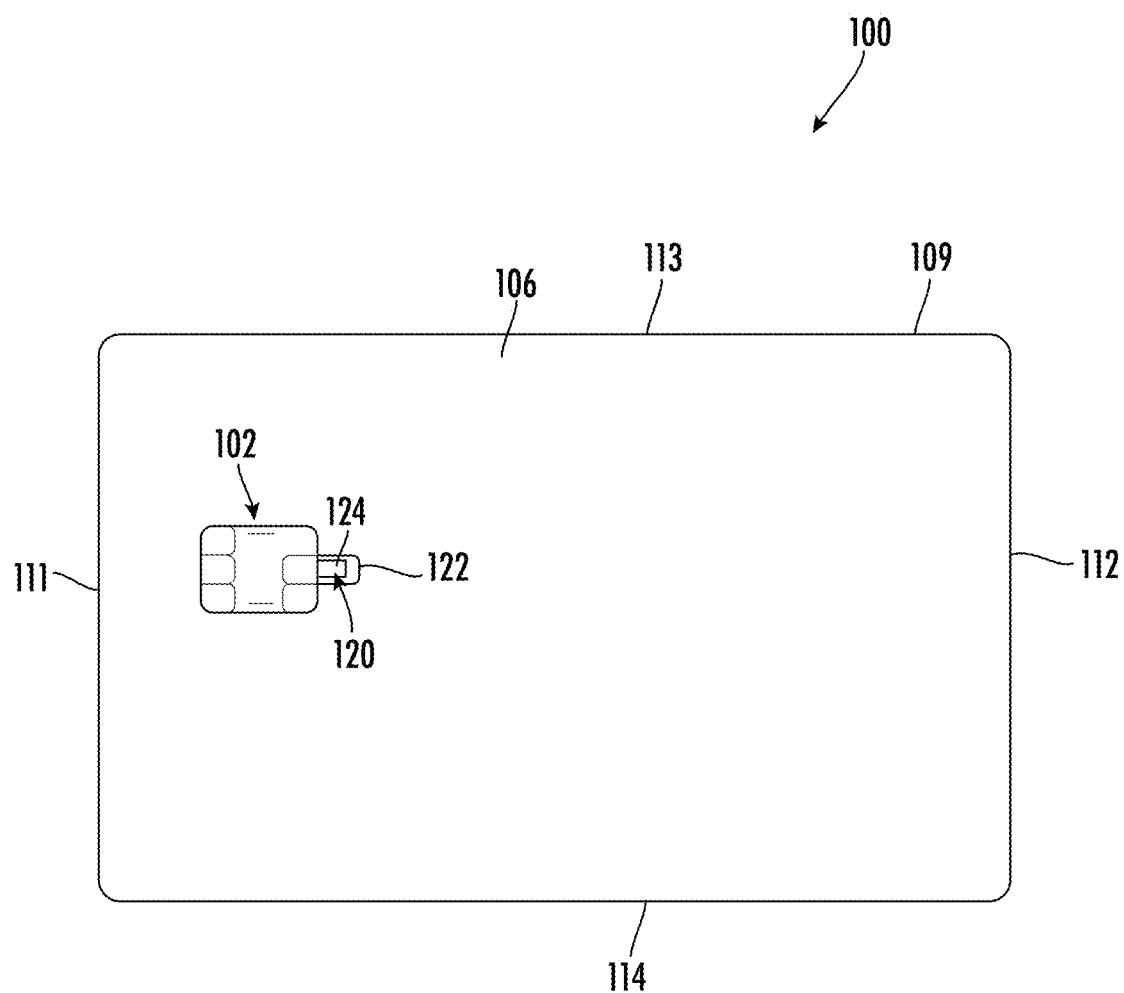
FIG. 1 is a top view illustrating a transaction card, in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to transaction cards including an identification (ID) chip, such as an EMV chip, and a chip removal element operable to decouple the chip from the card. The chip removal element may be located beneath the chip. As the chip removal element is pulled or otherwise moved away from the transaction card, the chip may be dislodged and removed from the transaction card without the use of typical card destruction tools.

Referring now to FIG. 1, an example transaction card (hereinafter "card") 100 according to embodiments of the disclosure will be described. The card 100 may be a credit or debit card, a RFID passport, or an access card. As will be described in greater detail herein, the card 100 may include multiple layers each having one or more functions. Although non-limiting, the card 100 may be made from polyvinyl chloride (PVC), polyester, polycarbonate, or metal (e.g., a pure metal or metal alloy). Described sometimes herein as contactless due to the method of communication by an identification chip 102 (hereinafter "chip"), such as an EMV chip or RFID chip, the card 100 may also provide one or more functions requiring contact. For example, the card 100 may include a magnetic stripe (not shown) and/or a microchip connected to contacts present on an outer layer of the card 100.

As used herein, the chip 102 may be any microprocessor device configured to exchange data electromagnetically. RFID chips may include a radio frequency inductor, volatile or non-volatile memory storage, a microprocessor, circuitry logic, and/or an antenna. While in some embodiments electromagnetic data communications from RFID chips will take place at radio frequencies, other embodiments may exchange electromagnetic data at different frequencies.

The card 100 may include a chip removal element ("CRE") 120 disposed between the chip 102 and a body 104 of the card 100, wherein a first end 124 of the CRE 120 may be positioned within a tab recess 122 along a first main side 106 of the body 104. In some embodiments, the tab recess 122 may generally extend from only one side of the chip 102, towards a center of the body 104. During use, the CRE 120 is operable to decouple the chip 102, or a portion of the chip 102, from the body 104 when the CRE 120 is moved away from the body 104.

The body 104 may include the first main side 106 opposite a second main side (not shown). Although non-limiting, the first main side 106 may correspond to a front or top side of the card 100, while the second main side may correspond to a back or bottom side of the card 100. The first main side 106 and the second main side are joined by a side surface 109 extending around a perimeter of the body 104. The body 104 may further include a first end 111 opposite a second end 112, and a first side 113 opposite a second side 114.

Figure 2:
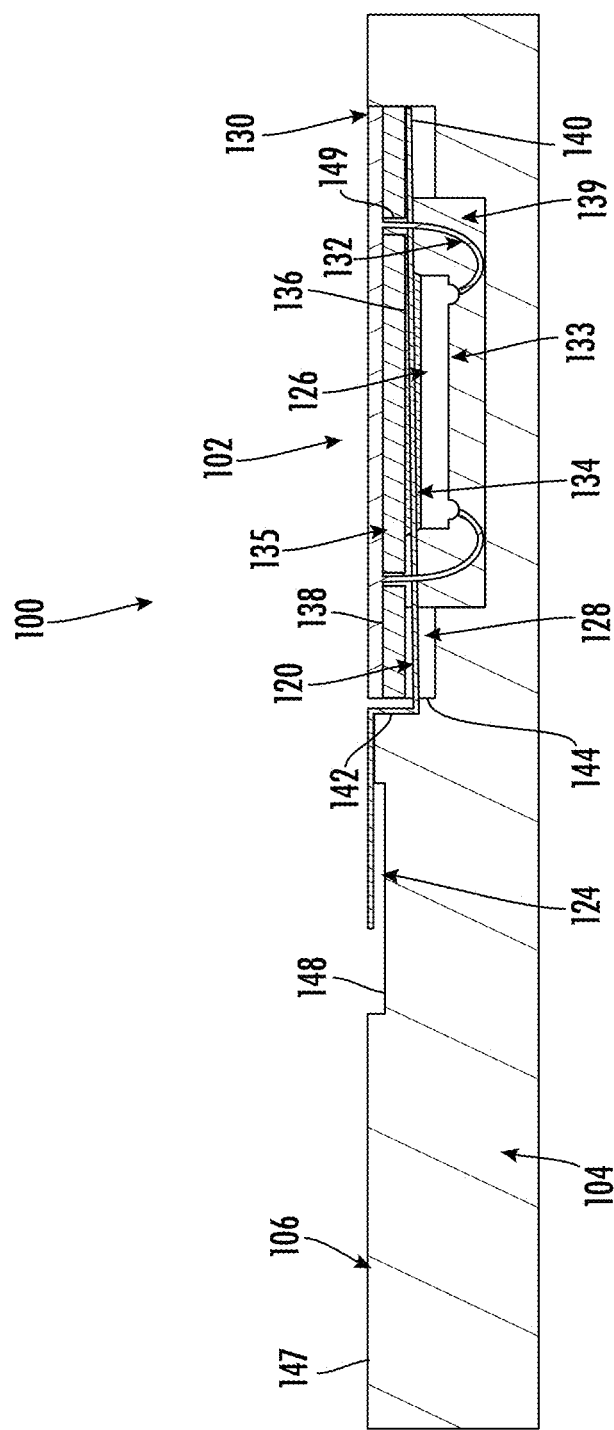
FIG. 2 is a side cross-sectional view of the transaction card of FIG. 1, in accordance with embodiments of the present disclosure.

Referring to FIG. 2, the chip 102 and the CRE 120 will be described in greater detail. Although non-limiting, the chip 102 may be a wire-bonded chip in this embodiment. As shown, the chip 102 may be positioned within a chip recess 128 of the first main side 106 of the body 104, wherein the chip 102 may include a die 126 coupled to a contact 130 by a set of electrical connections (e.g., wires or leads) 132. In some non-limiting embodiments, the electrical connections 132 may be directly attached to an interior side 133 of the die 126. As will be described in greater detail herein, decoupling the chip 102 from the body 104 using the CRE 120 causes the set of electrical connections 132 to fracture, rendering the chip 102 unusable.

The chip 102 may further include a die attach 134 coupled between the die 126 and the contact 130. In some embodiments, the chip 102 may include a substrate (e.g., $FR_4$ PCB) 135, wherein the die attach 134 may be directly coupled to an inner surface 136 of the substrate 135, and wherein the contact 130 may be directly coupled to an outer surface 138 of the substrate 135. Formed over the die 126 and the die attach 134 may be an encapsulant 139. As shown, the encapsulant 139 may extend over, or enclose, the die 126, the die attach 134, and the electrical connections 132. The encapsulant 139 may further extend into a set of openings 149 of the substrate 135. Although non-limiting, the encapsulant 139 may be a non-conductive epoxy molding compound.

In some embodiments, a second end 140 of the CRE 120 may extend within and terminate at one end the chip recess 128, and the first end 124 of the CRE 120 may extend along the first main side 106 of the body 104. The first end 124 of the CRE 120 may remain uncovered/exposed to an exterior of the first main side 106 for ease of access by a user. As shown, the second end 140 of the CRE 120 may not extend along an exterior surface 147 of the first main side 106 to ensure the CRE 120 does not interfere with chip reading devices, for example. The tab recess 122 may provide a gap between the first end 124 of the CRE 120 and the first main side 106 of the body 104 to permit access to the CRE 120 by a user. In other embodiments, the first end 124 of the CRE 120 may extend along a bottom surface 148 of the tab recess 122 to prevent the first end 124 of the CRE 120 from extending above a plane defined by the exterior surface 147 of the first main side 106. As such, the first end 124 of the CRE 120 does not interfere with reading of the chip 102 during use. Although not limited to any particular configuration, the first end 124 and the second end 140 of the CRE 120 may extend along different planes, while a vertical portion 142 of the CRE 120 may extend substantially perpendicular to the first and second ends 124, 140. In some embodiments, the vertical portion 142 may extend along an inner sidewall 144 of the chip recess 128.

Although non-limiting, the CRE 120 may be a rigid or semi-rigid strip or flap of material configured to tear/move along a predetermined path. More specifically, the CRE 120 may be tab, lever, bar, arm, shaft or any other type of elongated object that can be pulled or lifted to move away from the first main side 106 of the body 104. Furthermore, the CRE 120 may be adhesive or non-adhesive. It will be appreciated that the CRE 120 may have a stiffness or strength great enough to remove the chip 102 without breaking or significantly bending before the chip 102 is removed entirely.

In the embodiment shown, the CRE 120 may be directly coupled to the die attach 134, e.g., by an adhesive. In other embodiments, the CRE 120 may be directly coupled to the die 126 and sandwiched between the die 126 and the die attach 134. In other embodiments, the CRE 120 may be sandwiched between the die attach 134 and the substrate 135. In other embodiments, the CRE 120 may be positioned between the substrate 135 and the contact 130. In still other embodiments, the CRE 120 may be coupled to more than one component of the chip 102. For example, the CRE 120 may include multiple elements or layers coupled to one or more of the die attach 134, the substrate 135, the die 126, the contact 130, the electrical connections 132, etc.

During assembly, the chip 102 may first be secured to the CRE 120, e.g., by an adhesive, and then secured within the chip recess 128. Securing the chip 102 to the CRE 120 may include sandwiching the CRE 120 between the substrate 135 and the die 126, and then securing the electrical connections 132 to the contact 130. The encapsulant 139 may then be deposited within the chip recess 128 to cover the various components of the chip 102.

Figure 3A:
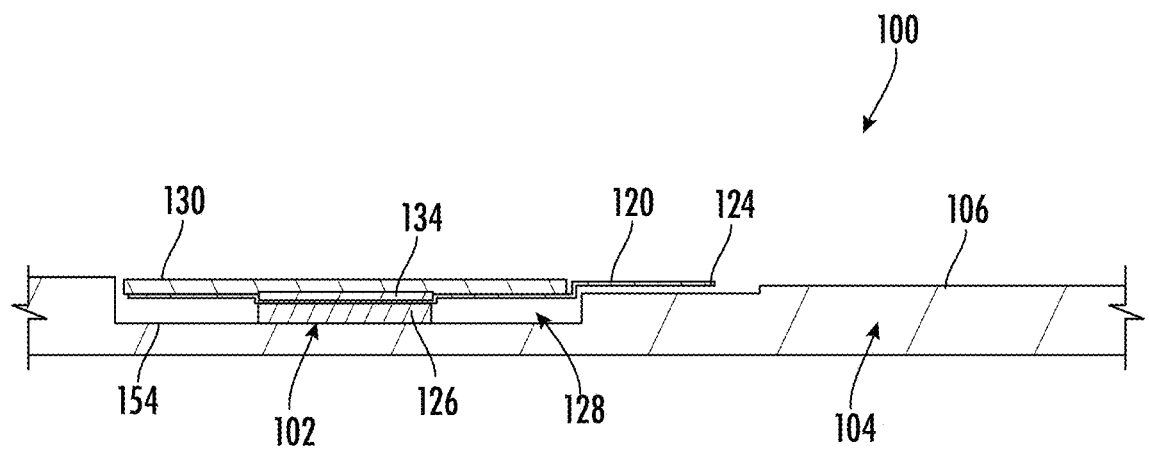
FIGS. 3A-3B are side cross-sectional views of the transaction card of FIG. 1, in accordance with embodiments of the present disclosure.
Figure 3B:
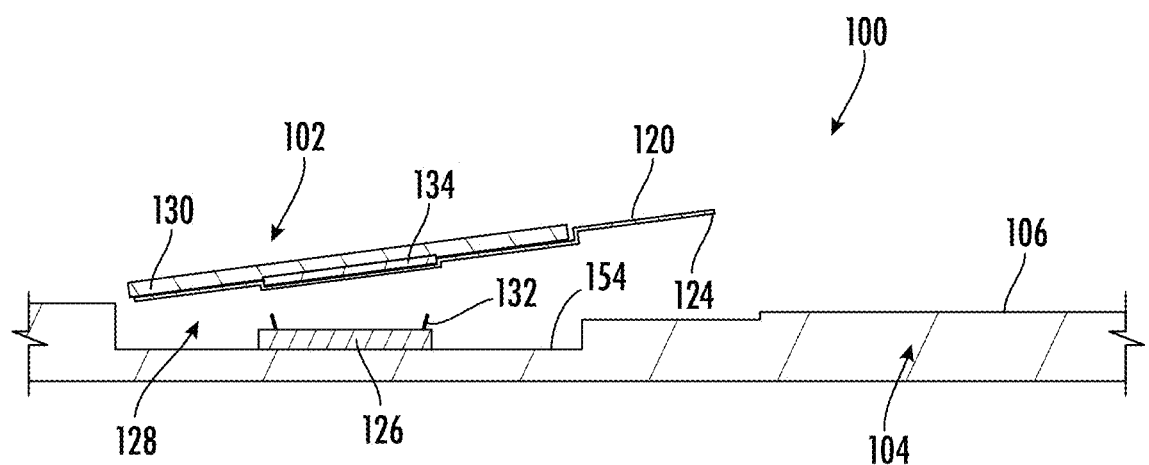

As shown in FIGS. 3A-3B, the CRE 120 may be moved away from the first main side 106 of the body 104 to decouple the chip 102 from the body 104, thereby disabling the chip 102 by severing or fracturing the electrical connections 132. For example, the user may employ a fingernail or mechanical tool to initially engage the first end 124 of the CRE 120. In this embodiment, the contact 130 and at least a portion of the die attach 134 may be separated from the die 126 and the electrical connections 132, as shown in FIG. 3B. The die 126 may remain attached to a bottom surface 154 of the chip recess 128 in some embodiments. Once removed from the chip recess 128, the user is then free to discard or destroy the chip 102 and CRE 120 without having to destroy the remainder of the card 100. This may be particularly beneficial, e.g., when the body 104 of the card 100 is made primarily from metal. It will be appreciated that not all components of the die 126, e.g., as shown in FIG. 2, are illustrated in FIGS. 3A-3B for ease of illustration.

Figure 4:
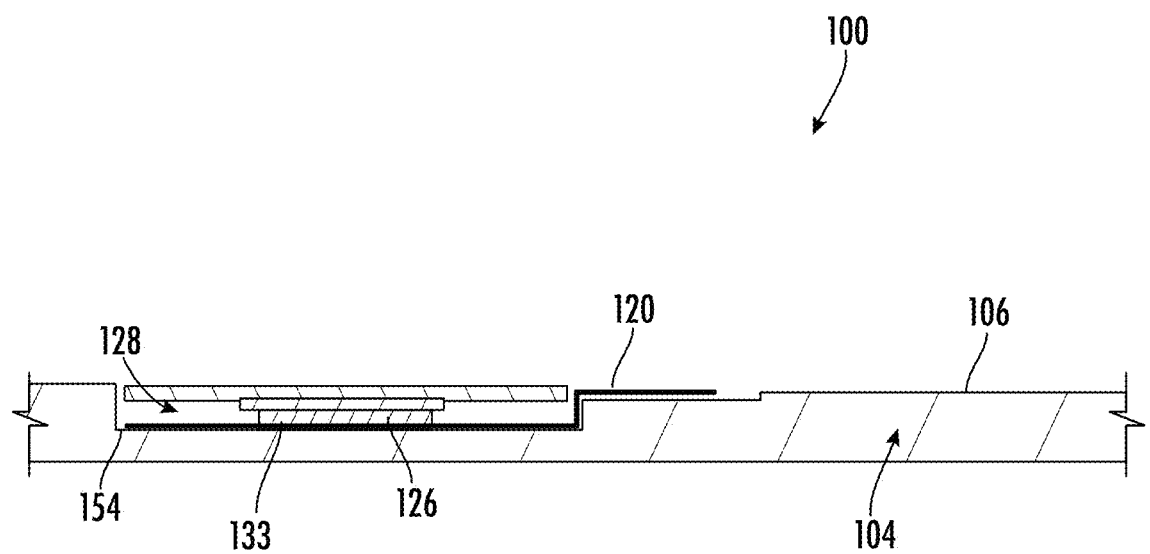
FIG. 4 is a side cross-sectional view of a transaction card in accordance with embodiments of the present disclosure.

In the embodiment of FIG. 4, the CRE 120 may be directly coupled to the interior side 133 of the die 126 and/or to the bottom surface 154 of the chip recess 128. The CRE 120 may be moved away from the first main side 106 of the body 104 to decouple the chip 102 from the chip recess 128, thereby disabling the chip 102.

Figure 5A:
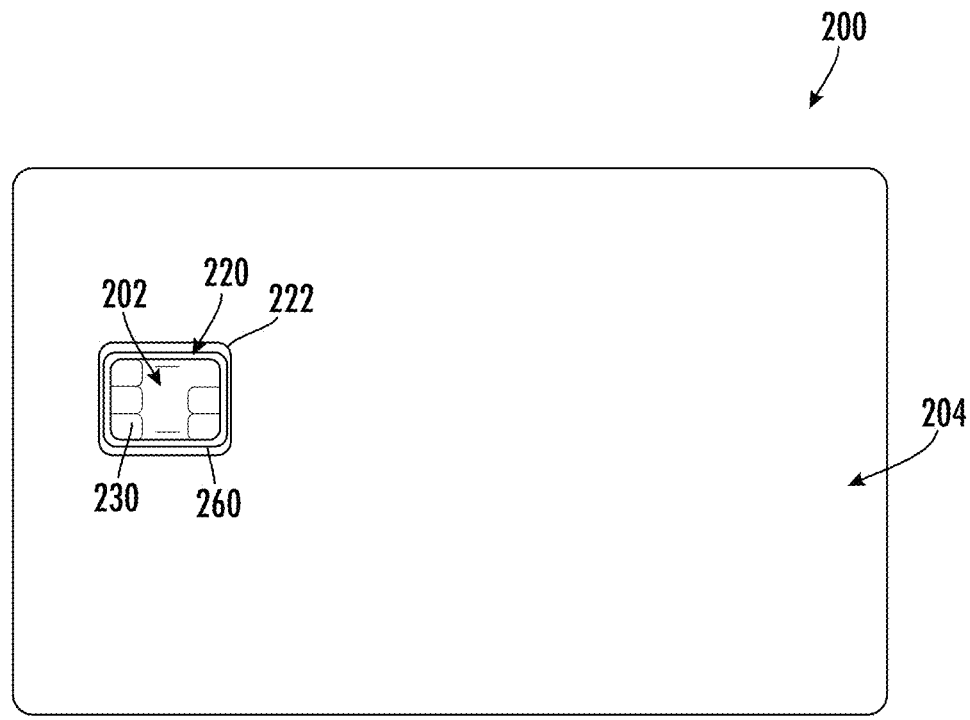
FIG. 5A is a top view illustrating a transaction card, in accordance with embodiments of the present disclosure.
Figure 5B:
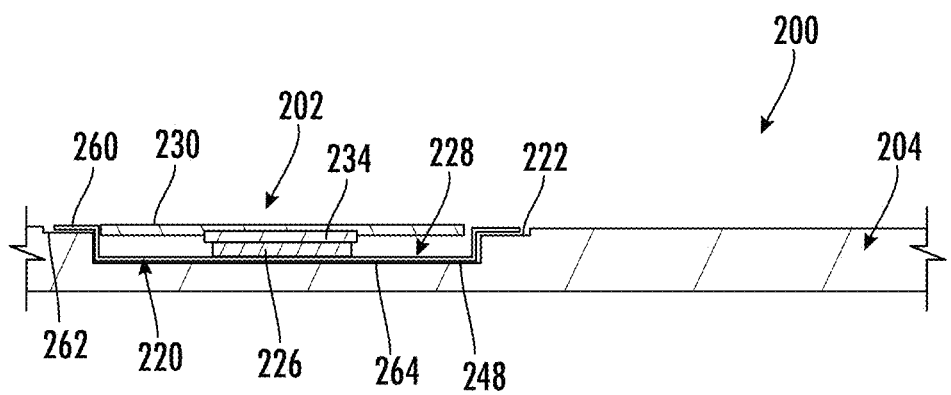
FIG. 5B is a side cross-sectional view of the transaction card of FIG. 5A, in accordance with embodiments of the present disclosure.

Referring now to FIGS. 5A-5B, another example transaction card (hereinafter "card") 200 according to embodiments of the disclosure will be described. The card 200 may be the same or similar to the card 100 described above. As such, only certain aspects of the card 200 will hereinafter be described for the sake of brevity. The card 200 may include a chip removal element ("CRE") 220 disposed between a chip 202 and a body 204. More specifically, the CRE 220 may be positioned within a chip recess 228 and a tab recess 222 of the first main side 206 of the body 204. In the embodiment shown, the chip recess 228 may extend partially or entirely around the chip 202. An exterior perimeter or border 260 of the CRE 220 may be exposed to an exterior of the first main side 206 of the body 204 and may generally extend along a bottom surface 262 of the tab recess 222. A main portion 264 of the CRE 220 may extend along a bottom surface 248 of the chip recess 228. During use, the CRE 220 is operable to decouple the chip 202, or a portion of the chip 202, from the body 204 when the CRE 220 is moved away from the body 204.

Although not shown in detail, the chip 202 may be a wire-bonded chip including a die 226 coupled to a contact 230 by a set of electrical connections (e.g., wires or leads), and a die attach 234 coupled between the die 226 and the contact 230. The chip 202 may further include a substrate, wherein the die attach 234 may be directly coupled to an inner surface of the substrate, and wherein the contact 230 may be directly coupled to an outer surface of the substrate. Formed over one or more portions of the chip 202 may be an encapsulant.

Although non-limiting, the CRE 220 may be rigid or semi-rigid strip, plate, dish, vessel, or flap of material generally conforming to the shape of the chip recess 228 and the tab recess 222. During use, the CRE 220 may lifted and moved away from the first main side 206 of the body 204. The CRE 220 may be adhesive or non-adhesive. It will be appreciated that the CRE 220 may have a stiffness or strength great enough to remove the chip 202 without breaking or significantly bending.

In the embodiment shown, the CRE 220 may be directly coupled to the die 226 and/or the bottom surface 248 of the chip recess 228, e.g., by an adhesive. In other embodiments, the CRE 220 may be directly coupled to the die attach 234, between the die 226 and the die attach 234. In other embodiments, the CRE 220 may be sandwiched between the die attach 234 and the substrate. In other embodiments, the CRE 220 may be positioned between the substrate and the contact 230. In still other embodiments, the CRE 220 may be coupled to more than one component of the chip 202.

Turning now to FIG. 6, a method 300 according to embodiments of the disclosure will be described in greater detail. At block 301, the method 300 may include providing a body of a transaction card, the body including a first main side opposite a second main side, and a chip recess in the first main side. In some embodiments, the transaction card may be a credit or debit card, a RFID passport, or an access card. In some embodiments, the chip recess is a cavity along the first main side of the body. In some embodiments, the chip recess is connected to a tab recess, the tab recess also being a cavity along the first main side of the body.

At block 302, the method 300 may include coupling a chip to a chip removal element. In some embodiments, the chip removal element may be a tab or lever configured to partially extend within the chip recess and the tab recess. In some embodiments, the chip removal element extends entirely around an outer perimeter of the chip. In other embodiments, the chip removal element and the tab recess extend from only one side of the chip, towards a center of the body.

At block 303, the method 300 may include inserting the chip and the chip removal element within the chip recess, wherein the chip removal element is sandwiched between the chip and a bottom surface of the chip recess, and wherein a border or end of the chip removal element is positioned within the tab recess along the first main side of the body. In some embodiments, coupling the chip removal element to the chip may include directly coupling the chip removal element to the die and to a bottom surface of the tab recess. In some embodiments, coupling the chip removal element to the chip may include directly coupling the chip removal element to a die attach of the chip, wherein the die attach is positioned between a die and a contact of the chip.

The method may further include forming an encapsulant over the die attach and the die. The encapsulant is further formed over a set of electrical connections connecting the die and the contact. In some embodiments, the encapsulant may be formed over the chip after the chip removal element is secured to the chip.

In some embodiments, the method 300 may further include decoupling the chip from the body by moving the chip removal element away from the body, wherein moving the chip removal element away from the body severs or otherwise damages the set of electrical connections, rendering the chip non-functional.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term "adhesive" used herein may refer to any type of substance used for sticking objects or materials together and may be classified in a variety of ways depending on their chemistries (e.g., epoxies, polyurethanes, polyimides), their form (e.g., paste, liquid, film, pellets, tape), their type (e.g., hot melt, reactive hot melt, thermosetting, pressure sensitive, contact, etc.), or their load carrying capability (structural, semi-structural, or non-structural).

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the card 100 and the card 200 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 300 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 300 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
    a body including a first main side opposite a second main side;
    a chip comprising a contact and a die coupled with the contact via a set of electrical connections; and
    a chip removal element disposed between the chip and the body, wherein a first end of the chip removal element is operable to decouple the contact from the body, wherein decoupling the contact from the body causes the set of electrical connections to fracture.

2. The transaction card of claim 1, further comprising a die attach between the die and the contact, wherein the chip removal element is directly coupled to the die attach.

3. The transaction card of claim 1, wherein the chip removal element comprises a second end in a chip recess of the first main side of the body between the contact and the body.

4. The transaction card of claim 3, wherein the chip removal element is directly coupled to the die, and wherein the chip removal element is positioned between the die and a bottom surface of the chip recess.

5. The transaction card of claim 3, wherein the chip removal element is positioned between a die attach and the die.

6. The transaction card of claim 3, wherein a tab recess extends around the chip recess.

7. The transaction card of claim 6, wherein the chip removal element extends around the chip, and wherein an outer border of the chip removal element is positioned within the tab recess.

8. The transaction card of claim 1, the body comprising a first side opposite a second side and a first end opposite a second end, wherein a tab recess extends towards a center of the body.

9. The transaction card of claim 1, wherein a tab recess extends from only one side of the chip.

10. A transaction card, comprising:
a body including a first main side opposite a second main side;
a chip comprising a die and a contact, the contact coupled with the die via a die attach and a set of electrical connections; and
a chip removal element coupled with the die attach, wherein the chip removal element is operable to decouple at least part of the chip from the body, wherein decoupling the at least part of the chip from the body causes the set of electrical connections to fracture.

11. The transaction card of claim 10, wherein the chip removal element comprises a second end in a chip recess of the first main side of the body between the die attach and the die.

12. The transaction card of claim 10, wherein the chip removal element comprises a second end in a chip recess of the first main side of the body between the contact and the die attach.

13. The transaction card of claim 10, wherein the chip removal element is directly coupled to the die, and wherein the chip removal element is positioned between the die and a bottom surface of a chip recess.

14. The transaction card of claim 10, wherein a second end of the chip removal element terminates within a chip recess.

15. The transaction card of claim 10, wherein a tab recess extends around a chip recess, and wherein the chip removal element extends around the chip.

16. The transaction card of claim 10, the body comprising a first side opposite a second side and a first end opposite a second end, wherein a tab recess extends from a chip recess towards a center of the body.

17. A method, comprising:
providing a body of a transaction card, the body comprising a first main side opposite a second main side;
coupling a chip removal element to a chip, wherein the chip includes a die coupled with a contact via a set of electrical connections; and
coupling the chip and the chip removal element in a chip recess of the body, the chip removal element operable to decouple at least part of the chip from the body, wherein decoupling the at least part of the chip from the body fractures the electrical connections.

18. The method of claim 17, wherein coupling the chip removal element to the chip comprises directly coupling the chip removal element to the die of the chip and to a bottom surface of the chip recess.

19. The method of claim 17, wherein coupling the chip removal element to the chip comprises:
directly coupling the chip removal element to a die attach of the chip, wherein the die attach is positioned between the die and the contact of the chip; and
forming an encapsulant over the die attach and the die, wherein the encapsulant is further formed over the set of electrical connections connecting the die and the contact.

20. The method of claim 19, further comprising decoupling the chip from the body by moving the chip removal element away from the body, wherein moving the chip removal element away from the body severs the set of electrical connections.

* * * * *